United States Patent [19]
Adachi et al.

[11] Patent Number: 5,886,652
[45] Date of Patent: Mar. 23, 1999

[54] PSEUDO FIXED DATA TRANSMISSION DEVICE AND METHOD

[75] Inventors: Satoru Adachi; Toshio Miki, both of Yokohama; Tomoyuki Ohya; Toshiro Kawahara, both of Yokosuka, all of Japan

[73] Assignee: NTT Mobile Communications Network, Inc., Japan

[21] Appl. No.: 692,857

[22] Filed: Jul. 30, 1996

[30] Foreign Application Priority Data

Aug. 3, 1995 [JP] Japan .................................. 7-198785

[51] Int. Cl.$^6$ .......................................... H03M 7/40
[52] U.S. Cl. ................................. 341/67; 341/63
[58] Field of Search ................... 341/67, 65, 63

[56] References Cited

U.S. PATENT DOCUMENTS

| | | | |
|---|---|---|---|
| 4,319,267 | 3/1982 | Mitsuya et al. | 358/75 |
| 4,816,914 | 3/1989 | Ericsson | 358/133 |
| 4,849,810 | 7/1989 | Ericsson | 358/133 |
| 5,166,686 | 11/1992 | Sugiyama | 341/155 |
| 5,235,623 | 8/1993 | Sugiyama et al. | 375/122 |
| 5,404,168 | 4/1995 | Yamada et al. | 348/405 |
| 5,631,644 | 5/1997 | Katata et al. | 341/67 |

FOREIGN PATENT DOCUMENTS 5344539  12/1993  Japan .

OTHER PUBLICATIONS

David Redmil "Robust architectures for image Video Coding" 2nd International Workshop on Mobile Multimedia Communcications (MoMuC), Apr. 1995.

H. Suda and T. Miki "An Error Protected 16kbit/s Voice Transmission for Land Mobile Radio Channel" IEEE J–SAC, vol. 6, No. 2. pp. 346–352, 1988.

J. Hagenauer "Rate–compatible punctured convolutional codes (RCPC codes) and their applications" IEEE Trans. on Communications, COM–26, pp. 389–400, Apr. 1988.

*Primary Examiner*—Marc S. Hoff
*Assistant Examiner*—Peguy JeanPierre
*Attorney, Agent, or Firm*—Rogers & Wells LLP

[57] ABSTRACT

For the transmission of variable length coded data blocks, a threshold arithmetic calculation circuit (9) obtains a threshold from an average of the bit lengths of the variable length coded data blocks for each group of such block, and the judgment circuit (10) makes a judgment as to whether or not those variable length coded data blocks have bit lengths exceeding the threshold of the block group to which such data blocks belong. Then, a block divider circuit 11 divides the variable length coded data blocks having bit lengths exceeding the threshold into blocks having small bit lengths. Each block thus obtained is fixedly equalized in bit length to an average length level and transmitted in that condition.

20 Claims, 8 Drawing Sheets

PSEUDO FIXED DATA TRANSMISSION DEVICE AND METHOD

BACKGROUND OF THE INVENTION

This invention relates to a variable length coded data transmission device for pseudo-fixing various bit lengths of data blocks, which are obtained by variable length coding, to a constant length level and transmitting the data blocks in that condition.

The variable length coding is a coding method, in which codes having different bit lengths are assigned respectively to various data in accordance with frequency of appearance of each data item, in order to reduce the quantity of code. Therefore, although the end locations of the codes, which codes were subjected to variable length coding processing, are different from each other, it will still be possible that the individual codes are correctly decoded and the ends of the individual codes are correctly recognized only if the bit string is correctly read because the decoding is made at the time point when the bits are read on equivalent to the length of the specific code.

If code errors should occur during the transmission of the variable length coded data, the coded data would be decoded incorrectly as if they had a different code length. As a consequence, an out-of-synchronization occurs and therefore, decoding is carried out in a wrong manner for a long period of time even after the recovery of code errors. This, in fact, significantly deteriorates the quality of decoded signals. As one method for prevent possible adverse effects from such out-of-synchronization attributable to code errors, there is known a method as discussed in a printed material written by David Redmil under the heading of "Robust Architectures for Image and Video Coding" 2nd International Workshop on Mobile Multimedia Communications (MoMuC), April 1995, in which bit lengths of variable length coded data blocks are averaged for each group of data blocks so that the bit length of each data block in any selected group will become equal. The bit length of each block thus averaged is fixed so that each block has a pseudo fixed bit length, and then each data block is transmitted in that condition. In this printed material, the variable length coded data are properly divided into several blocks taking advantage of the nature or characteristic of the variable length codes during the transmission of data such that each divided data item has a predetermined length. Such divided coded-data are used to detect the ends of the codes during the decoding process by judging whether or not the codes can be decoded and then returned to their original variable length codes.

This method will now be described with reference to FIG. 9.

Now, presume that there are a number, N, of variable length coded data blocks and that a bit length of each variable length coded data block i satisfies $b_i$ ($0 \leq i \leq N-1$). It should also be noted that any numerical value including i is hereinafter supposed as a mod N.

First, prior to transmission of the number, N, of variable length coded data blocks, an average $s \geq (1/N)$ sum $b_i$ (where the sum is an operator indicating a sum of i=0 to N-1) is obtained.

Then, a number, N, of slots each having a bit length s is imagined. Various stages of operation to be described hereinafter are made with respect to those slots. On the first stage, as indicated by S1, each bit constituting the variable length coded data block i ($0 \leq i \leq N-1$) is filled in each bit location constituting each slot i ($0 \leq i \leq N-1$). At that time, with respect to the block i which satisfies bi<s, the slot i has excessive bits (namely, the slot i has extra space to receive additional bits). On the other hand, with respect to the block i which satisfies bi>s, all of the bits cannot be filled into the slot i. If some blocks have too many bits to fill therein, the process proceeds to the second stage. On second stage, with respect to those bits, which could not be filled in the block i, a judgment is made as to whether or not they can be filled in the following slot (namely, adjacent slot) as indicated by S2. If the bit length of the block i+1 to be assigned to the following slot i+1 satisfies $b_{i+1}$<s, the slot i+1 has an empty area behind the bits of the block i+1 and therefore, the excessive bits, which could not be filled in the slot i and overflowed, are filled in this empty area. In case there still remains a block having bits, which could not be filled in the empty area of the slot i+1, the process proceeds to the third stage where the remaining excessive bits are filled in the following slot i+2 of the slot i+1 as indicated by S3. If such a filling operation is repeated by N-times at the most, the bits of the number, N, of the blocks can all be filled in the slots. The resultantly obtained data can be handled as the number, N, of pseudo-fixed length codes (hereinafter referred to as the "fixed length data block") having bit lengths as indicated by S4.

In this way, each variable length coded data block is caused to have a pseudo fixed length, then each coded data block having such a pseudo fixed length is transmitted in that condition and decoded on the receiver side. Here, the fixed length data blocks arriving, one after another, at the receiver side include the variable length coded data blocks. In order to detect the end of a variable length coded data block, it is necessary to finish the decoding of the block. However, as is apparent from the hereinbefore description, a top portion of the variable length coded data block necessarily occupies a top portion of the fixed length data block received. Accordingly, on the receiver side, decoding of the received code is started always at the start timing of the fixed length data block.

When decoding is over with respect to a number, one, of the variable length coded data block, decoding is started with respect to the following variable length coded data block. However, with respect to the variable length coded data block which is astride a plurality of slots and transmitted in that condition, decoding is not finished even after the decoding was made with respect to the bits of the last s-th slot. In the light of this fact, therefore, with respect to such a variable length coded data block which is received in a fashion astride a plurality of slots, a required number of slots (namely, those slots over which the data block is astride) are prepared to receive all bits of the variable length coded data block so that decoding can be performed. That is, for decoding, the procedures at each stage are performed in the following manner. First, suppose the number, N, of slots having a bit length s are present and presume that the received fixed length coded data blocks are filled respectively in these slots. On the first stage, decoding is performed from the top bit location of each slot. At that time, if there is present a slot, whose decoding is not yet finished, in a location somewhere before the s-th bit, the process proceeds to the second stage. On the second stage, the slot i whose decoding is not yet finished is checked as to whether or not decoding was finished in the following slot i+1 and a judgment is made as to whether or not a block i+1 satisfying $b_{i+1}$<s is obtained. If the judgment result is affirmative, the bits of the remaining area in the slot i+1 are added to the slot i and decoding is further performed with respect to the slot i. If the decoding is not yet finished in spite of the addition of the bits in the slot i+1, the process proceeds to the third stage where the bits in the following slot i+2 of the slot i+1 are added. If this bit-adding operation is repeatedly performed by the same number of times as at the time of transmission of data, the original number, N, of variable length code blocks can be obtained.

As discussed hereinbefore, the variable length coded data blocks are formed as pseudo-fixed length codes having s*N bits, and transmitted together with the value of s. With respect to each block to be transmitted at the start timing of the slot, even if transmission errors occurred to the preceding block, no out-of-synchronization, which would otherwise occur due to transmission errors, will occur and decoding is performed at the normal timing. That is, even if errors occur in the midway, a correct synchronization can be obtained for each block at the time for decoding. Thus, an occurrence of decoding errors on a large scale can be prevented.

On the other hand, aside from the method for obtaining a correct synchronization in the manner as just mentioned, an idea of an application of error correction code may come across the mind as one of the methods for effectively preventing deterioration of the quality of decoded signals due to signal errors during the time for transmission of data. As a method for applying an error correction code, aside from the method for applying a constant error correction code to all data, a bit selective error correction is effective in which error correcting ability of the error correction code is partly varied. This method is particularly effective to data which have different sensitivity for code error (error sensitivity) depending on part of the data. This bit selective error correction is known in the name of BS-FEC (Bit Selective Forward Error Correction) or UEP (Unequal Error Protection) (hereinafter simply referred to as "BS-FEC"). The details are described, for example, in a printed material written by H. Suda and T. Miki, "An Error Protected 16 kbit/s Voice Transmission for Land Mobile Radio Channel" IEEE J-SAC, vol. 6, No. 2, pp. 346–352, 1988.

Now, presume that there is found a variable length coded data block j having a remarkably longer bit length than the rest of the variable length coded data blocks when there is employed the method for causing the variable length coded data blocks to have a pseudo-fixed length and transmitting the data blocks in that condition, as previously mentioned. The various bits constituting such a variable length coded data block j are distributed to many other slots than the slot j. Since those bits are filled in the rear empty area of each slot instead of being filled in the leading end area of each slot, they are subjected to adverse effects of the out-of-synchronization caused by code errors occurred in each fixed length data block during the time for transmission of data. As apparent from the discussion made hereinbefore, the above conventional transmission method has such a vital disadvantage in that in case there are some variable length coded data blocks having a remarkably longer bit length than the rest of the blocks, adverse effects to the variable length coded data blocks due to the code errors are even increased.

Also, presume a case where an error correction code is applied when data are to be transmitted in the state that the data has a pseudo-fixed length. In this case, it is not desirable to apply a constant correction code to all data because error sensibility is sometimes different depending on part of the data. In such a case, some data become unduly redundant, thus degrading the transmission efficiency. In case the BS-FEC is applied, it becomes necessary for such data whose code length and code configuration are varied due to variable length coding applied thereto to simultaneously transmit application patterns of the error correction codes as additional data which application patterns correspond to the data and error sensibility of the data. Moreover, if error sensibility is different depending on minor data items, it will be necessary to change the error correction codes more frequently.

As discussed above, the conventional technology is encountered with a problem in that when error correction codes are applied, effective operation is difficult to make in case the error sensibility is different depending on part of the data.

SUMMARY OF THE INVENTION

The first object of the present invention is to provide, in order to obviate the above problems, a variable length coded data transmission device, in which adverse effects of code errors due to out-of-synchronization can always be obtained by carrying out pseudo-fixing the length of a variable length code. Another object of the invention is to provide a variable length coded data transmission device which is obtained by further improving the variable length coded data transmission device capable of achieving the first object, so that error correction is performed in a more efficient manner.

From one aspect for the present invention, therefore, there is provided a variable length coded data transmission device comprising:

threshold arithmetic calculation means for calculating a threshold corresponding to a bit length of each variable length coded data block for each block group consisting of a plurality of variable length coded data blocks to be transmitted;

judgment means for judging whether or not each variable length coded data block has a bit length exceeding the threshold; and block division means for dividing, when the judgment result of the judgment means is affirmative, the variable length coded data block having a bit length exceeding the threshold into a plurality of data blocks and returning the data blocks to the original block group;

fixed length data blocks, whose bit lengths are averaged, being constituted utilizing the data blocks obtained by the block division means and the rest of the variable length coded data blocks for each block group and being transmitted, so that the data are synchronized for each fixed length data block.

In the conventional technique, since even those blocks which have a remarkably longer bit length than other blocks are fixed in length as they are, such a remarkably long block is distributed into a plurality of slots and transmitted in that condition. Accordingly, when the remarkably long data block is decoded, it is seriously adversely affected by code errors in other blocks and can hardly enjoy such advantageously effects as being able to prevent an occurrence of out-of-synchronization. In contrast, according to the teaching of the present invention, such a remarkably long block is divided into a plurality of blocks by the variable length coded data transmission device and finally fixed in length, and therefore, the problem for deteriorating the quality of decoded data due to adverse effects from code errors caused by distributing the remarkably long blocks into a plurality of blocks can be obviated. As a consequence, an occurrence of out-of-synchronization can be prevented.

From another aspect of the invention, there is also provided a variable length coded data transmission device comprising:

threshold arithmetic calculation means for calculating a threshold corresponding to a bit length of each variable length coded data block for each block group consisting of a plurality of variable length coded data blocks to be transmitted;

judgment means for judging whether or not each variable length coded data block has a bit length exceeding the threshold; and group separation means for separating variable length coded data blocks having a bit length exceeding the threshold from the respective block groups to which the variable length coded data blocks belong, so that the separated data blocks constitute a new group of data blocks;

fixed length blocks, whose bit lengths are averaged, being constituted utilizing the variable length coded data blocks for each block group and being transmitted, so that the data are synchronized for each fixed length data block.

According to a device thus constructed, such a block, which has a remarkably longer bit length than other variable length coded data blocks, is moved to other groups from the group to which the block originally belongs and finally separately fixed in length. Accordingly, the problem for deteriorating the quality of decoded data due to adverse effects from code errors caused by distributing the remarkably long blocks into a plurality of blocks can be obviated. As a consequence, an occurrence of out-of-synchronization can be prevented.

Preferably, in the variable length coded data transmission device according to this invention, the threshold arithmetic calculation means obtains a threshold based on an average value of the bit lengths of variable length coded data blocks belonging to each block group.

From a further aspect of the invention, there is provided a variable length data transmission device comprising:

fixing length means for constituting a fixed length data block, whose bit lengths are equalized to an average length level utilizing variable length coded data blocks for each block group consisting of a plurality of variable length coded data blocks to be transmitted, distribution number arithmetic calculation means for calculating a distribution number indicating how many numbers of fixed length data blocks to which each variable length coded data block is distributed by the fixing length means; and block division means for dividing a variable length coded data block, whose distribution number exceeds a predetermined threshold, into a plurality of data blocks and returning the data blocks to the original block group;

fixed length data blocks being newly constituted by the fixing length means for each block group processed by being divided by the block division means, the data blocks being transmitted in the form of the fixed length data block and synchronized for each fixed length data block.

Also, in a device thus constructed, those blocks having a remarkably longer bit length than other blocks are divided into a plurality of blocks and finally fixed in length. Accordingly, the problem for deteriorating the quality of decoded data due to adverse effects from code errors caused by distributing the remarkably long blocks into a plurality of blocks can be obviated. As a consequence, an occurrence of out-of-synchronization can be prevented.

From a still further aspect of the invention, there is provided a variable length data transmission device comprising:

fixed length means for constituting a fixed length data block, whose bit lengths are equalized to an average length level utilizing variable length coded data blocks for each block group consisting of a plurality of variable length coded data blocks to be transmitted;

distribution number arithmetic calculation means for calculating a distribution number indicating how many numbers of fixed length data blocks to which each variable length coded data block is distributed by the fixing length means; and group separation means for separating variable length coded data blocks having a distribution number exceeding the threshold from the respective block groups to which the variable length coded data blocks belong, so that the separated data blocks constitute a new group of data blocks;

fixed length data blocks being newly constituted by the fixing length means for each block group processed by the group separation means, the data blocks being transmitted in the form of the fixed length data block and synchronized for each fixed length data block.

Also, in a device thus constructed, those blocks, which have a remarkably longer bit length than other movable length coded data blocks, are moved to other groups from the groups to which those blocks originally belong and finally separately fixed in length. Accordingly, the problem for deteriorating the quality of decoded data due to adverse effects from code errors caused by distributing the remarkably long blocks into a plurality of blocks can be obviated. As a consequence, an occurrence of out-of-synchronization can be prevented.

According to a yet further aspect of the invention, there is provided a variable length coded data transmission device comprising:

block grouping means for classifying a plurality of variable length coded data blocks to be transmitted into several groups of blocks based on bit lengths thereof;

fixed length data blocks, whose bit lengths are averaged, being constituted utilizing the variable length coded data blocks for each block group and being transmitted, so that the data are synchronized for each fixed length data block.

In the conventional technique, the groups of the blocks are formed irrespective of bit length and fixed in length as they are. In contrast, according to the above device, the variable length coded data blocks are grouped in accordance with the bit lengths thereof and fixed in length. Owing to this arrangement, a difference between the bit lengths of those blocks belonging to the respective block groups can be reduced, and therefore, those blocks having a remarkably longer bit length than other variable length coded data blocks are difficult to exist in the block groups. Accordingly, the problem of adverse effects to the decoding process of the remarkably long blocks due to code errors in other blocks is difficult to occur.

Preferably, the variable length coded data transmission device according to the above invention further comprises means for effecting an error recovery such that sensitivity for code errors of data is steppingly varied within each fixed length data block and correction ability is steppingly varied within each block group consisting of a plurality of fixed length data blocks, the error recovery being carried out first from the top bit of each of the fixed length data blocks constituting each block group respectively.

By virtue of the above construction, error recovery of different correction ability depending on sensibility of data errors can be performed first from the top bit of each block. As a consequence, efficient error recovery can be realized without a need of additional data.

DETAILED DESCRIPTION OF PREFERRED MODE FOR CARRYING OUT THE INVENTION

Several modes for carrying out the present invention will now be described in order to obtain a better understanding of the present invention. It should be noted, however, that such embodiments merely show one mode for carrying out the present invention, and the invention should not be limited to those embodiments. Instead, various changes can be made, if necessary, without departing from the scope of the present invention.

A. First Mode for Carrying Out the Invention

Figure 1:
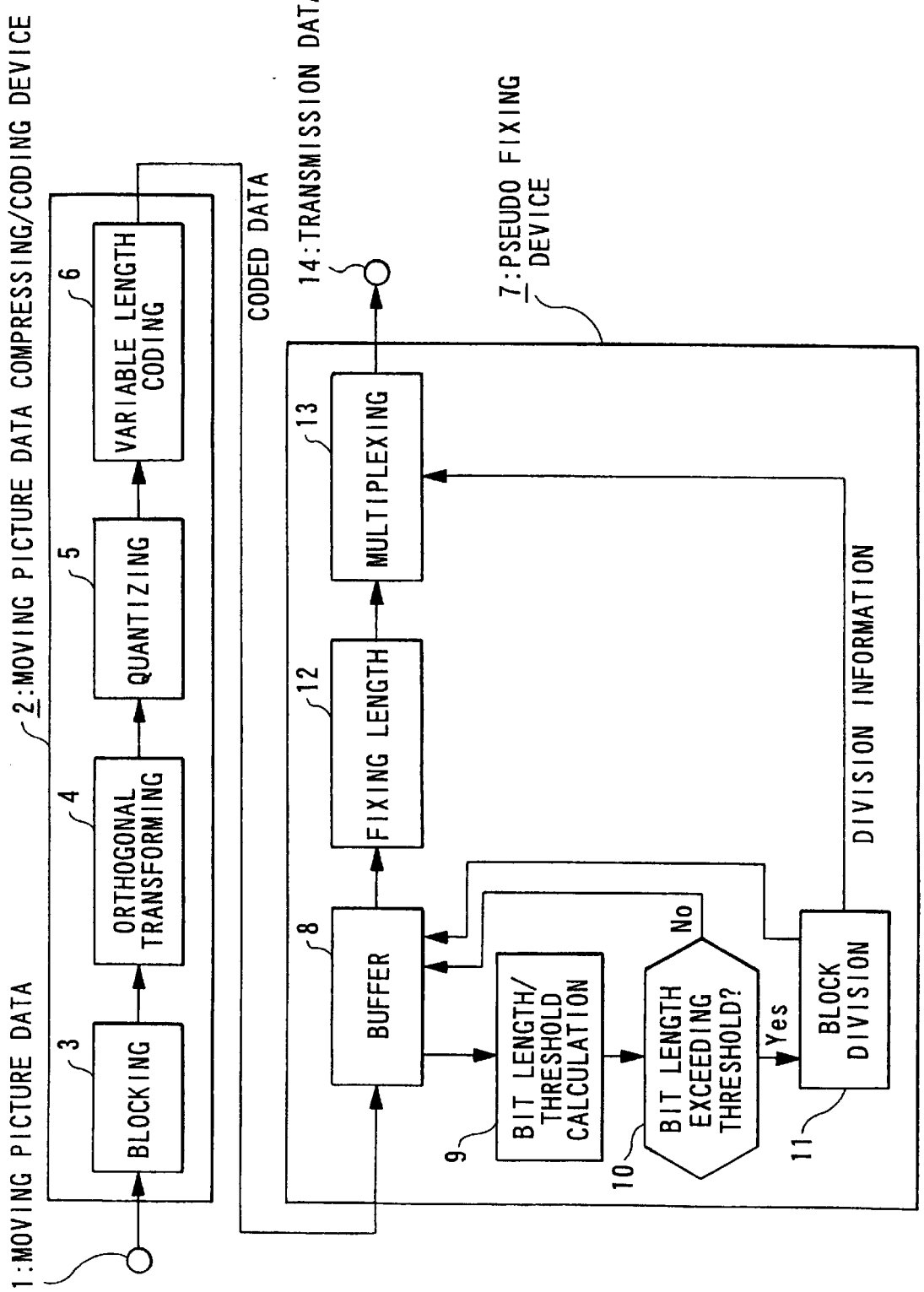
FIG. 1 is a block diagram showing a configuration of the first mode for carrying out the present invention which is embodied in the form of a moving picture code transmission device.
Figure 2:
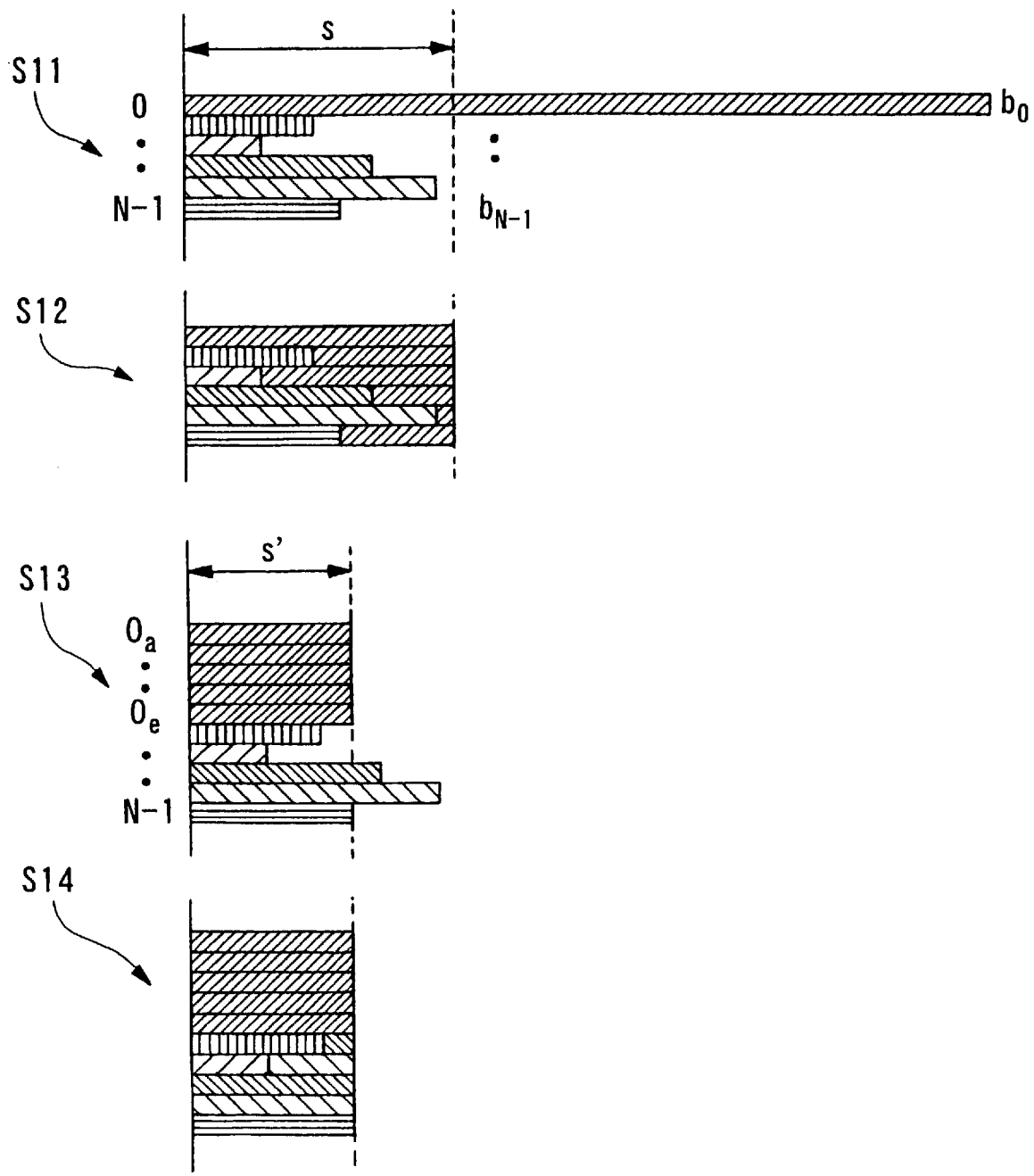
FIG. 2 is a representation for explaining the operation and effects of the above mode.

FIG. 1 shows one mode for carrying out the present invention, in which the present invention is applied to a moving picture code transmission device. This moving picture code transmission device comprises a moving picture data compressing/coding device 2 for compressing and variable length coding moving picture data input from an input terminal 1, and a pseudo fixing device 7 connected to the moving picture data compressing/coding device 2 and adapted to cause the blocks of variable length codes, which are output, one after another from the moving picture data compressing/coding device 2, to have a pseudo fixed length and to output those blocks in that condition. The moving picture data compressing/coding device 2 comprises a blocking circuit 3, an orthogonal transforming circuit 4, a quantizing circuit 5, and a variable length coding circuit 6. The pseudo fixing device 7 comprises a buffer 8, a threshold arithmetic calculation circuit 9, a judgment circuit 10, a block divider circuit 11, a fixing length circuit 12, and a multiplexing circuit 13.

One example of the moving picture data compressing/coding device 2 used here may be of the type which is made based, for example, on ITU-T Recommendation H. 261 "Video Codec for Audiovisual Services at p*64 kbit/s", March 1995.

Operation of this moving picture code transmission device will be described hereinafter.

A series of frames of moving picture data constituting a moving picture are gradually input, through the input terminal 1, into the blocking circuit 3 of the moving picture data compressing/coding device 2. The block circuit 3 divides those moving picture data corresponding to the respective frames into a plurality of blocks corresponding to a predetermined number of pixels. Then, the orthogonal transforming circuit 4 makes a two-dimensional orthogonal transformation with respect to each of those blocks. Consequently, a conversion factor corresponding to each block is obtained for each block. The conversion factors corresponding to the respective blocks are quantized by the quantizing circuit 5. Then, the conversion factors thus quantized are variable length coded by the variable length coding circuit 6 for each block, and output in the form of variable length coded data blocks.

The variable length coded data blocks, which the moving picture data compressing/coding device 2 outputs one after another as mentioned, are input into the pseudo fixing device 7. A plurality of variable length coded data blocks constitute groups of blocks, and data are stored in the buffer 8 for each block group. Here, as units for data blocks to be input and the groups of the blocks constituted by those data blocks, MB (macro-block) and GOB (group of blocks) may be used, respectively, presuming that a device of the type made based on ITU-T Recommendation H.261 is used, for example, as the moving picture data compressing/coding device 2. Then, the threshold arithmetic output circuit 9 obtains the following values for each group of the blocks stored in the buffer 8.

a. bit length of each variable length coded data block constituting the group of blocks involved.

b. An average bit length of all the variable length coded data blocks constituting the group of blocks involved.

c. A threshold corresponding to the average bit length.

This threshold is, for example, three times the average bit length.

Then, in the judgment circuit 10, a judgment is made as to whether or not each variable length coded data block involved has a remarkably longer bit length than those of the rest of the variable length coded data blocks. This judgment is made for each variable length coded data block. The judgment is made by comparing a threshold, which the threshold arithmetic calculation circuit 9 obtained, with the bit length of the block to be judged. The variable length coded data block, which was judged as having a longer bit length than the threshold at that time, is divided into data blocks having smaller bit lengths in the block divider circuit 11 and then returned to the group of blocks within the buffer, to which those data originally belong.

Here, the block divider circuit 11 divides the blocks into several equal parts such that each divided block part may have a smaller bit length than the average bit length of the blocks, and outputs information as to what block was divided and how many parts the block was divided into (this information is hereinafter referred to as "division information"). Aside from the division into several equal parts as shown in this example, the block divider circuit 11 may, of course, divides the blocks in many other ways. What is important here is that there is a some kind of notice or tacit understanding about the ways of division between the transmitter side (coding side) and the receiver side (decoding side) so that the receiver side can decode the coded data in such a manner well fitted to the ways of division which the transmitter side carried out.

The block divider circuit 11 may also divide each block into parts of a smaller unit of variable length coded data than block, if such a smaller unit exists. In this case, the division information required is only as to what block was divided.

In this way, the threshold arithmetic calculation circuit 9, the judgment circuit 10 and the block divider circuit 11 repeatedly carry out the prescribed procedures until the time when no variable length coded data block having remarkably longer bit lengths than those of the rest of the variable length coded data blocks will exist in the block group involved.

Thereafter, the variable length coded data blocks stored in the buffer 8 are supplied to the fixing length circuit 12 for each block group. The fixing length circuit 12 carries out pseudo-fixing the length of the variable length coded data blocks. Then, the multiplexing circuit 13 multiplexes the data blocks together with division information. Then, the data blocks thus multiplexed are output in the form of transmission data.

According to this conventional method, the variable length coded data blocks stored in the buffer 8 are delivered directly to the fixing length circuit 12, where the data blocks are caused to have pseudo fixed length. Accordingly, as indicated by S11, in case there are some variable length coded data blocks having remarkably longer bit lengths than those of the rest of the variable length coded data blocks, it was customary that such very long data blocks are transmitted in such a manner as to be scattered in a large number of slots as indicated by S12. As a consequence, in this example, if errors occur to any one of the blocks 0 to N–1, decoding procedures for the very long blocks are adversely affected. In contrast, according to this mode for carrying out the present invention, the variable length coded data blocks are subjected to processing of the threshold arithmetic calculation circuit 9, the judgment circuit 10 and the block divider circuit 11 before the data blocks are transmitted to the fixing length circuit 12. Owing to this arrangement, a variable length data block having a remarkably longer bit length than those of the rest of the variable length coded data blocks are first divided, as indicated by S13, into a plurality of blocks Oa through Oe having smaller bit lengths as indicated by S13, and thereafter, transmitted to the fixing length circuit 12 where the data blocks are fixed in length as indicated by S14. Accordingly, the divided very long blocks are hardly susceptible to adverse effects of errors occurred at least in the rest of the variable length coded data blocks and no problems of the type conventionally encountered occurs.

Although description is omitted here, the decoding system performs the procedures in the reverse way to the procedures in the coding system. In the decoding system, the divided blocks are connected together based on the multiplexed division information, so that the original image data can be obtained.

Figure 3:
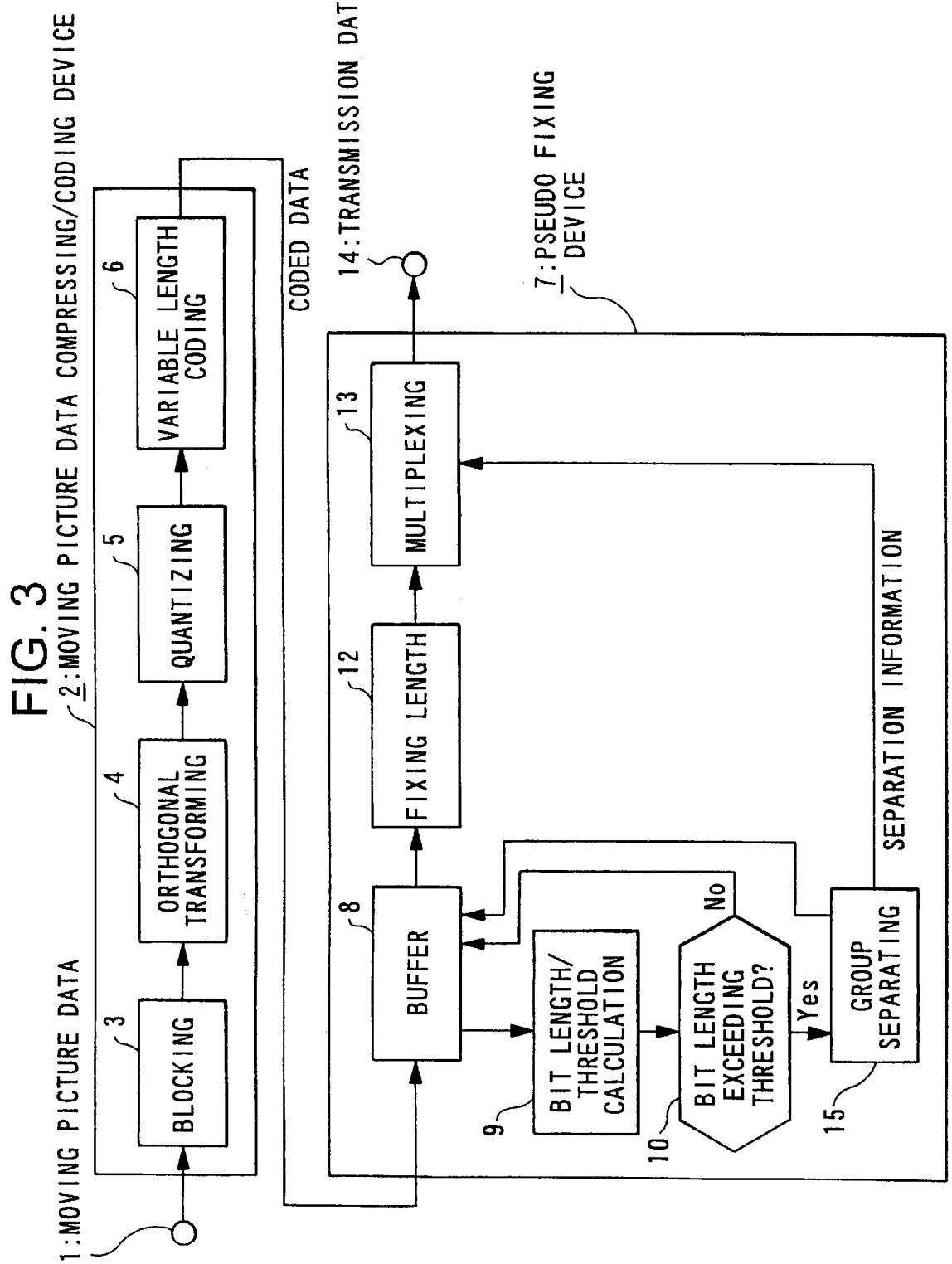
FIG. 3 is a block diagram showing a modified example of the above mode.

FIG. 3 shows another example, in which the block divider circuit 11 in the system of FIG. 1 is replaced by a group separating circuit 15. In this case, the respective variable length coded data blocks judged as having longer bit lengths than the threshold in the judgment circuit 10 are separated in the group separating circuit 15 from the block group to which the data blocks originally belonged, and gathered together to form separate new block groups so as to be returned to the buffer 8 in that condition. Thereafter, the old block groups and the block groups having longer bit lengths than the threshold are each caused to have a pseudo fixed length in the fixing length circuit 12. Here, the latter block group gathers only those variable length coded data blocks having a long bit length. Accordingly, the average value of the bit lengths of the variable length coded data blocks becomes, as a matter of course, larger than the former block groups. Accordingly, the latter block groups are transmitted in the form of fixed length data blocks having a remarkably longer bit length than the former block groups.

In this mode for carrying out the present invention, the multiplex circuit 11 multiplexes the division information of blocks and transmitted in that condition as previously noted. However, if the division of the blocks or the separation of the groups are uniformly performed due to nature or characteristic (for instance, difference between intraframe coding and interframe coding) of the blocks given in the moving picture data compressing/coding device 2, multiplexing of the division (or separation) information is unnecessary.

In this mode, the unit of the target of pseudo-fixing is expressed in the form of "block". It should be noted, however, that this unit may be any desired variable length code or a group thereof.

Further, in this mode, the moving picture data are described. It should be noted, however, that the present invention is not limited to the moving picture data but it can likewise be applied to the variable length coded data in general.

B. Second Mode for Carrying Out the Invention

Figure 4:
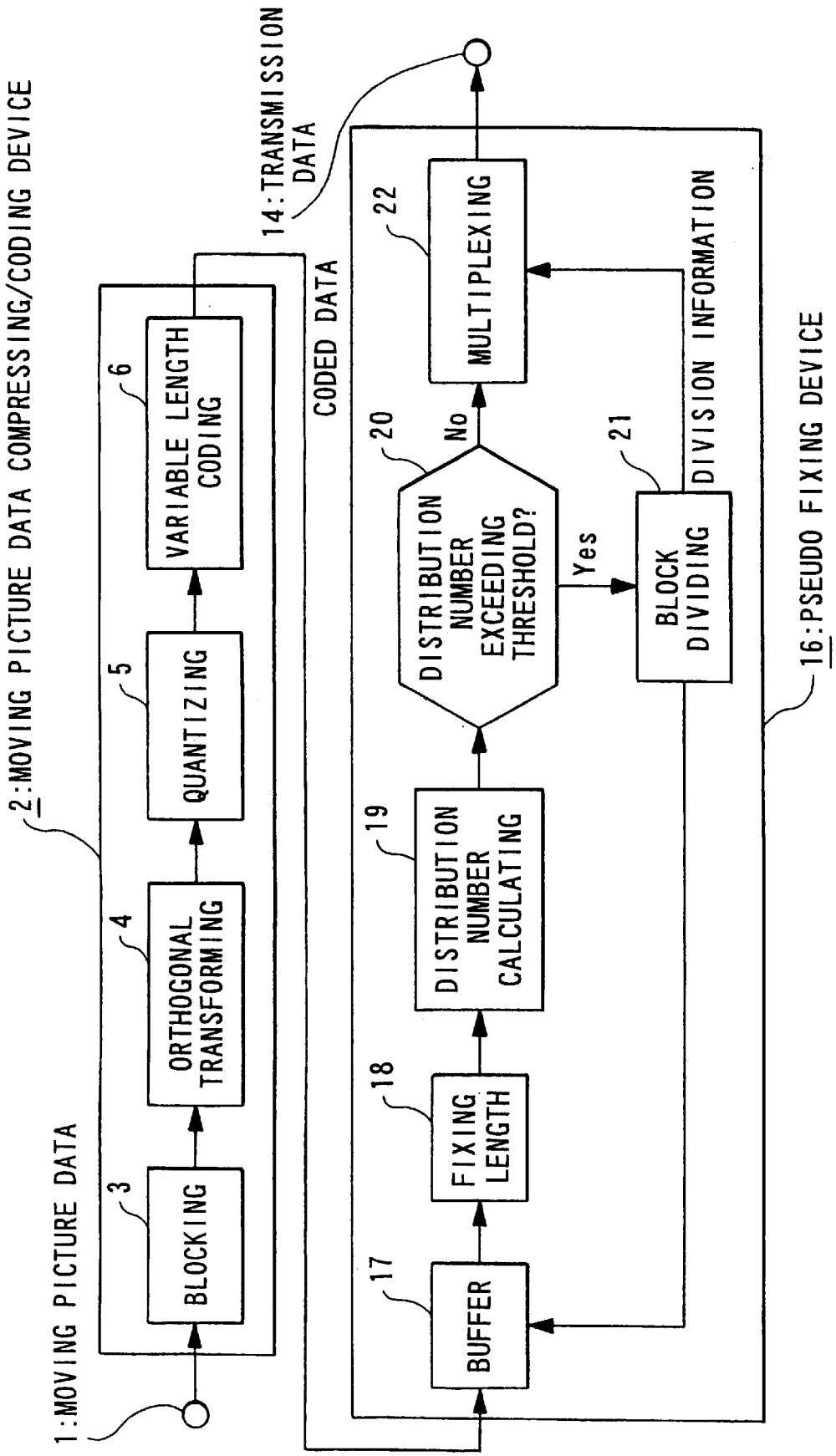
FIG. 4 is a block diagram showing a configuration of the second mode for carrying out the present invention which is embodied in the form of a moving picture code transmission device.

FIG. 4 shows a configuration of a moving picture code transmission device according to the second mode for carrying out the invention. The moving picture data compressing/coding device 2 is constructed in the same manner as FIG. 1. A pseudo fixing device 16 in this mode comprises, as shown in FIG. 4, a buffer 17, a fixing length circuit 18, a distribution number arithmetic calculation circuit 19, a judgment circuit 20, a block divider circuit 21, and a multiplexing circuit 22.

In the above configuration, variable length coded data blocks are input in the pseudo length fixing device 16 where the variable length coded data blocks form a group of blocks. Then, the data blocks are stored in the buffer 17 for each group of blocks. Then, the variable length coded data blocks in the buffer 17 are transmitted, one after another, to the fixing length circuit 18 for each group of blocks, so that fixed length data blocks having a uniformed bit length are formed.

Based on processing in the fixing length circuit 18, the distribution arithmetic calculation circuit 19 obtains the following values.

a. Distribution number indicating how many numbers of fixed length data blocks the variable length coded data blocks constituting each block group are distributed to.

b. Average bit number of variable length coded data blocks constituting each block group.

Then, the judgment circuit 20 judges whether or not the distribution number is too many for each variable length coded data block constituting each block group. This judgment is made by comparing the distribution number obtained in the distribution number arithmetic calculation circuit 19 with a predetermined threshold. The threshold is preset, for example, to ⅔ of the total slot number when the length is fixed. The block divider circuit 21 divides the variable length coded data block which was judged as having a larger distribution number than this threshold into a plurality of data blocks having a smaller bit length and returns the data blocks to the original block group stored in the buffer 17.

Here, the block divider circuit 21 equally divides the data block into several blocks such that each block has a bit length smaller than the average bit length of the blocks and then outputs information as to what blocks were divided and how many blocks they were divided into.

The block divider circuit 21 may divide the data block into a smaller variable length coded data unit than block, if available at all. In this case, the division information may be only the information as to what block is divided.

When the block division is finished, the variable length coded data blocks constituting the block group are newly fixed in length and judged.

If the judgment circuit 20 judges that all the variable length coded data blocks of the block group are smaller in distribution number than the threshold, the multiplexing circuit 22 multiplexes those data whose length are fixed, together with the division information and outputs the same in the form of transmission data to the output terminal 14.

In the conventional technique, the variable length coded data blocks stored in the buffer 17 are caused to have a pseudo fixed length in the fixing length circuit 18 and then directly output in the form of transmission data. In contrast, according to this mode for carrying out the present invention, the distribution arithmetic calculation circuit 19, the judgment circuit 20, and the block divider circuit 21 make a judgment as to whether or not an inadequate length fixing was made, that is, it is detected the presence or absence of variable length coded data blocks whose bits are distributed into a number of fixed length data blocks, after the fixing length processing is finished. If the presence is detected, those data blocks involved are divided. By doing this, the adverse effects of code errors attributable to the employment of a method for pseudo-fixing the length of the variable length code can be prevented even in the even that there are those blocks having a remarkably longer bit length than other variable length coded data blocks and almost all bits are distributed into other fixed length data blocks.

Although description is omitted here, the original image data can be obtained by seeking, in the decoding system, the procedure in the reverse way with respect to the procedure in the coding system and combining those blocks which were once divided based on the multiplexed block division information.

Figure 5:
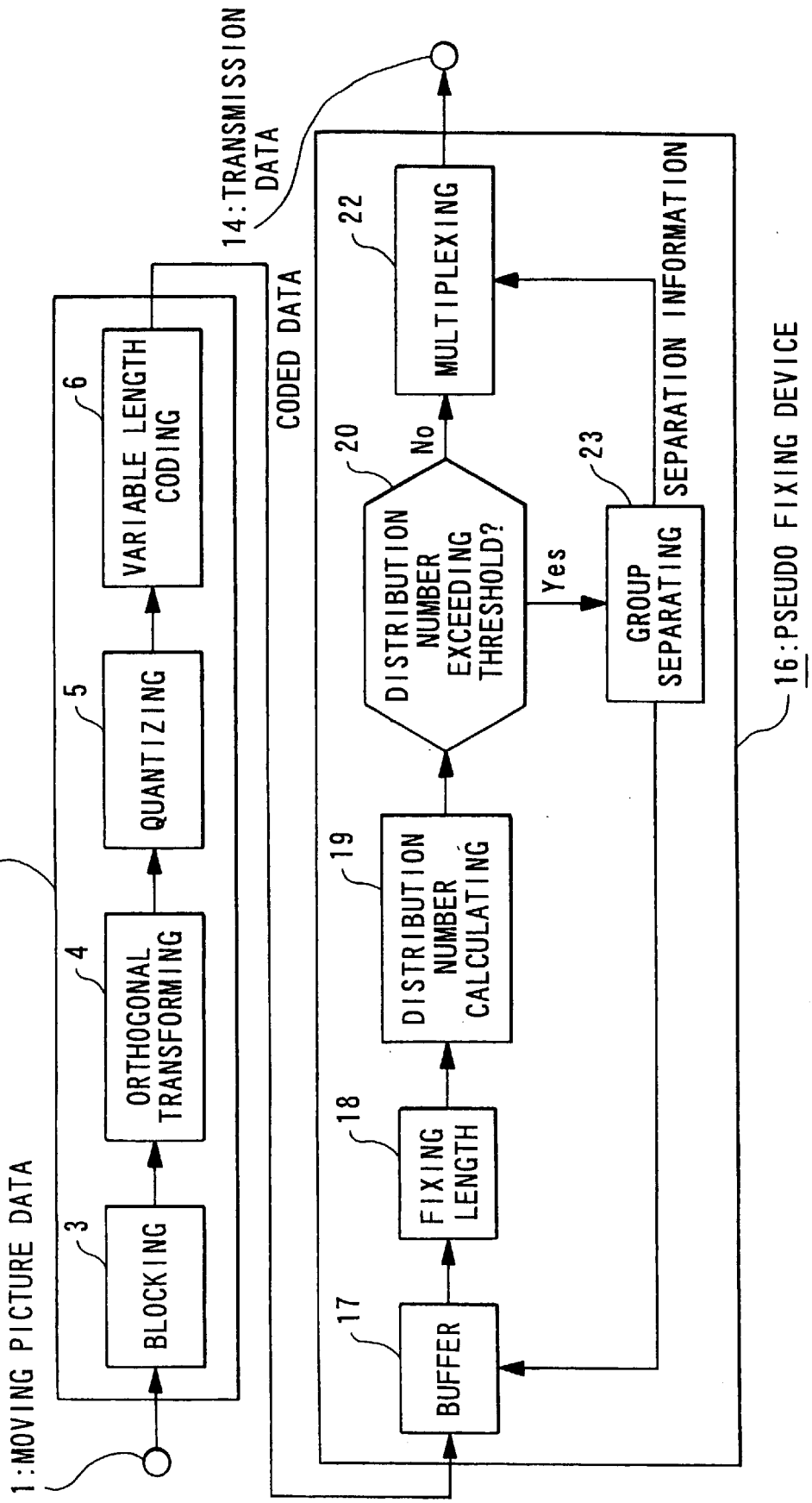
FIG. 5 is a block diagram showing a modified example of the above second mode.

FIG. 5 shows an example in which the block divider circuit 21 is replaced by a group separation circuit 23 in the configuration of FIG. 4. In this example, those block, which are judged as having a larger distribution number than the threshold in the judgment circuit 20, are separated into a new group in the group separation circuit 23 and returned to the buffer 17. Thereafter, the old groups and those groups exceeding the threshold are newly caused to have pseudo fixed lengths in the fixing length circuit 18.

Although the unit of artificial fixing length is expressed as block, this unit may be changed to any desired variable length code or group thereof.

It should be noted that although the moving picture data are described in this mode for carrying out the invention, the present invention is not limited to the moving picture data but it can likewise be applied to variable length coded data in general.

C. Third Mode for Carrying Out the Invention

Figure 6:
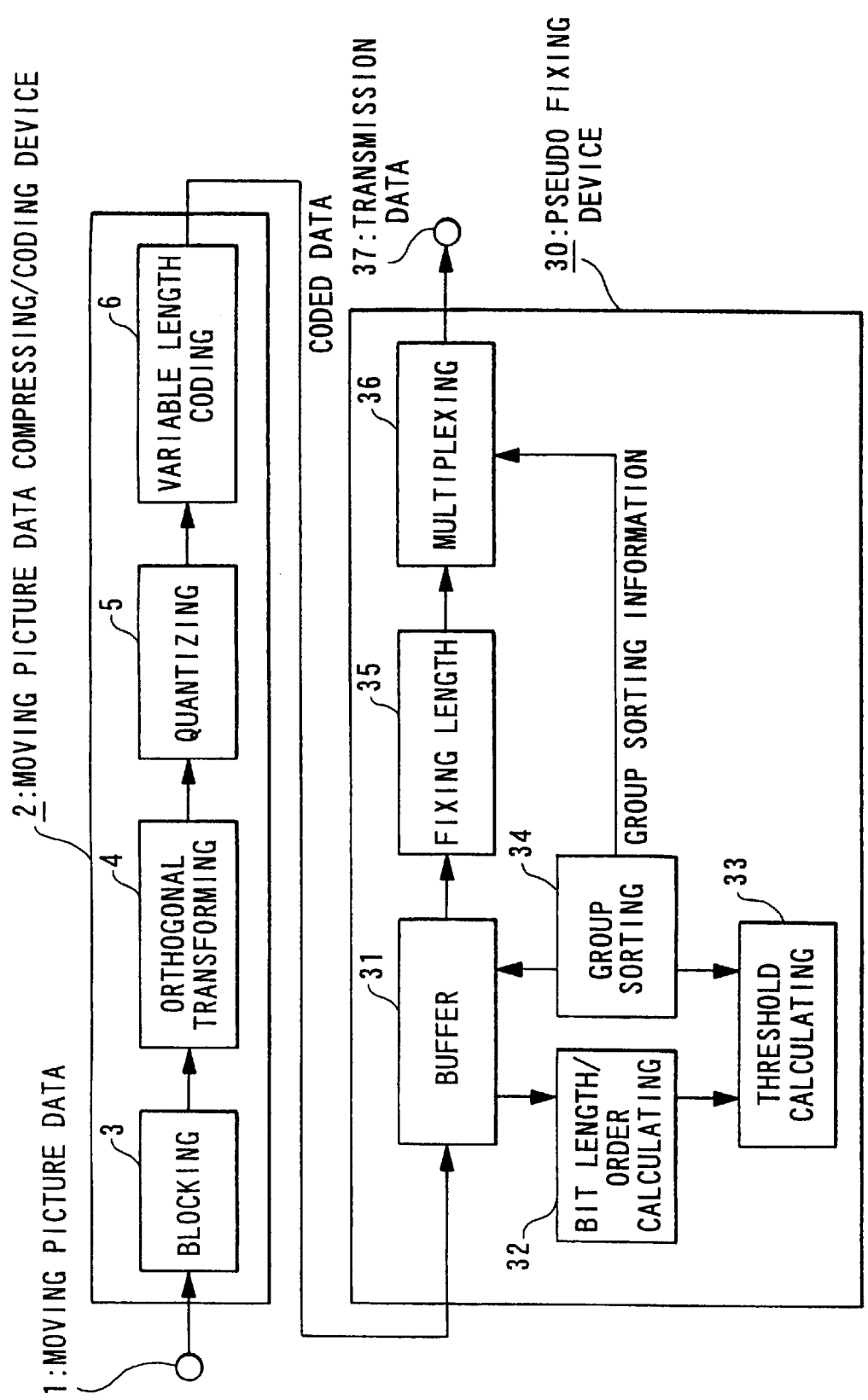
FIG. 6 is a block diagram showing a configuration of the third mode for carrying out the present invention which is embodied in the form of a moving picture code transmission device.

FIG. 6 is a block diagram showing a configuration of a moving picture code transmission device according to the third mode for carrying out the present invention. In this illustration, the moving picture data compressing/coding device 2 has the same configuration as that of FIG. 1. A pseudo fixing device 30 in this mode comprises, unlike that of FIG. 1, a buffer 31, a bit length/order arithmetic calculation circuit 32, a threshold arithmetic calculation circuit 33, a group sorting circuit 34, a fixing length circuit 35, and a multiplexing circuit 36.

In such a configuration as just mentioned, the variable length coded data blocks output from the moving picture data compressing/coding device 2 are input into the pseudo fixing device 30 in the unit of blocks which can constitute a plurality of block groups, and stored in the buffer 31. Then, the bit length/order arithmetic calculation circuit 32 detects the bit length of the variable length data blocks stored in the buffer 31 for each block and sequentially arranges those data blocks in accordance with the bit length. Subsequently, based on this information, the threshold arithmetic calculation circuit 33 establishes a threshold for sorting the blocks into predetermined several groups.

This threshold is established, for example, as follows. First, groups are formed in order of a longer bit length. For sorting the groups, a bit length difference is preliminarily obtained with respect to a block of a lower sequential rank, and the sorting is performed first between those two blocks which have the largest difference in bit length, then between those two blocks which have the next largest difference in bit length, and so on. Then, the sequential order of the block, which is located in the boundary of such group sorting, is served as a threshold. At that time, a rule may be established, stipulating that when a threshold is selected, adjacent blocks having adjacent sequential order ranks will not be selected in order not to create a group including only one block or a group including most of the blocks.

Then, the group sorting circuit 34 sorts the blocks into several groups based on the threshold thus calculated. In doing this group sorting, the group sorting circuit 34 outputs group sorting information indicating what block is sorted to what group to the multiplexing circuit 36. When the group sorting is finished, the variable length coded data blocks are returned from the group sorting circuit 34 to the buffer circuit 31, and supplied to the fixing length circuit 35 for each group. The fixing length circuit 35 fixes the length of the data blocks. Then, the multiplexing circuit 36 multiplexes the data having a pseudo fixed length, together with the group sorting information and outputs the data in the form of transmission data to the output terminal 37.

In the conventional technique, blocks are grouped irrespective of the bit length of the variable length coded data blocks stored in the buffer 31, then transmitted directly to the fixing length circuit 35 and then cased to have a pseudo fixed length. In contrast, according to this mode for carrying out the invention, the variable length coded data blocks are sorted into several groups based on the bit length via the bit length/order arithmetic calculation circuit 32, the threshold arithmetic calculation circuit 33, and the group sorting circuit 34 and then transmitted to the fixing length circuit 35. By doing this, since the bit length difference of the blocks belonging to the various block groups can be reduced, it becomes difficult for those blocks which have a remarkably longer bit length than other variable coded data blocks to exist in each block group. Consequently, the problem will hardly occur, in which adverse effects are given to the decoding processing of the remarkably long blocks due to code errors in those blocks having the remarkably longer bit length than other blocks.

Although description is omitted here, the original image data can be obtained by executing in the decoding system the procedures in the reverse way to the procedures in the coding system and rearranging the blocks, which were once sorted into several groups based on the multiplexed group sorting information, in the original sequential order pattern.

In this mode for carrying out the present invention, the group sorting is performed first between those two blocks having the largest bit length difference among the blocks arranged in order to larger bit length. However, the group sorting is not limited to this and any other suitable group sorting algorithm may be employed such as, for example, the number of block groups is preliminarily established and group sorting is performed such that the number of blocks in each block group will be equal.

In this mode for carrying out the present invention, the unit of the target of pseudo-fixing is expressed in the form of "block". It should be noted, however, that this unit may be any desired variable length code or a group thereof.

Further, in this mode, the moving picture data are described. It should be noted, however, that the present invention is not limited to the moving picture data but it can likewise be applied to the variable length coded data in general.

Furthermore, this mode for carrying out the invention may be combined with selected one of the above-mentioned first and second modes for carrying out the invention. According to such a configuration, even if those blocks having a remarkably longer bit length than other variable length coded data blocks should exist in a block group, the problem of adverse effects to the decoding processing of the remarkably long block due to code errors in other blocks can be avoided.

D. Fourth Mode for Carrying Out the Invention

Figure 7:
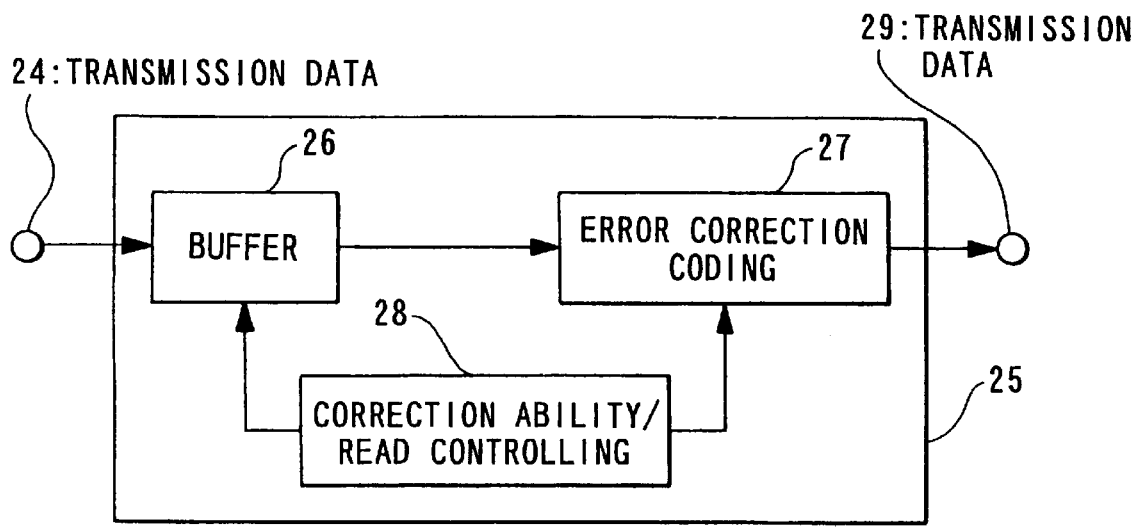
FIG. 7 is a block diagram showing a configuration of the fourth mode for carrying out the present invention which is embodied in the form of an error correction coding system.

FIG. 7 shows an error correction coding system for recovering errors of the transmission data output from the coding system for pseudo-fixing a bit length of the type as shown in FIGS. 1 through 6.

The transmission data having pseudo fixed lengths are input from an input terminal 24 to an error correction coding device 25. The data thus input are stored in a buffer 26 for each group of the blocks whose length is fixed. Then, data reading procedures are executed with respect to the buffer 26 in accordance with a pre-established pattern under the control of an error correction ability/buffer read control circuit 28. All the blocks stored in the form of groups in the buffer 26 are gradually read first with the top bit, and then subjected to error correction coding processing in an error correction coding circuit 27. Error correction is executed such that those bits occupying the area in the rear side of the blocks is more lowered in error correction ability. One such error correction method is taught, for example, by reference printed material written by J. Hagenauer "Rate-compatible punctured convolutional codes (RCPC codes) and their applications" IEEE Trans. on Communications, COM-26, pp. 389–400, April 1988.

Figure 8:
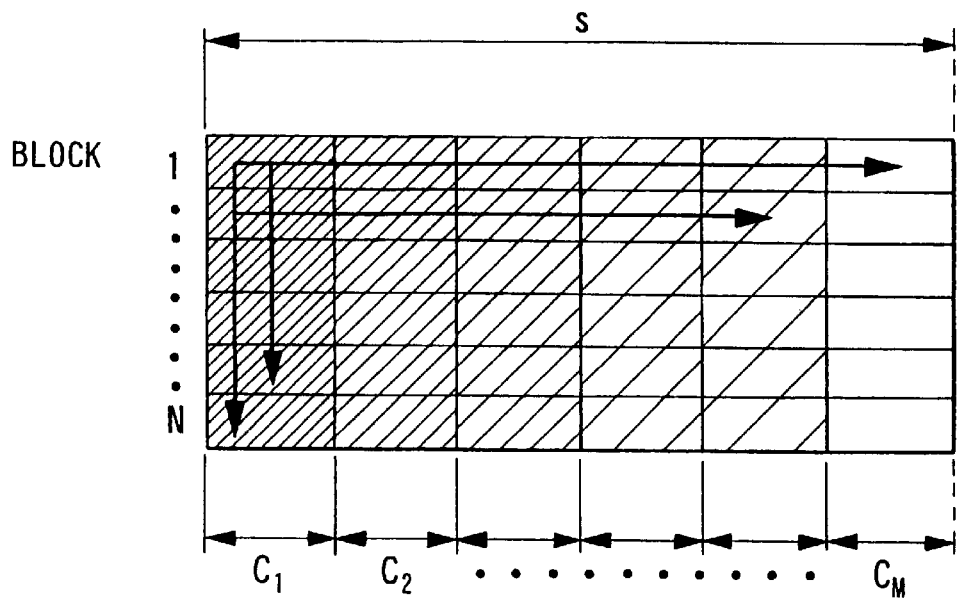
FIG. 8 is a chart showing the direction of reading data and the ability of error correction in a buffer 26 and an error correction coding circuit 27.
Figure 9:
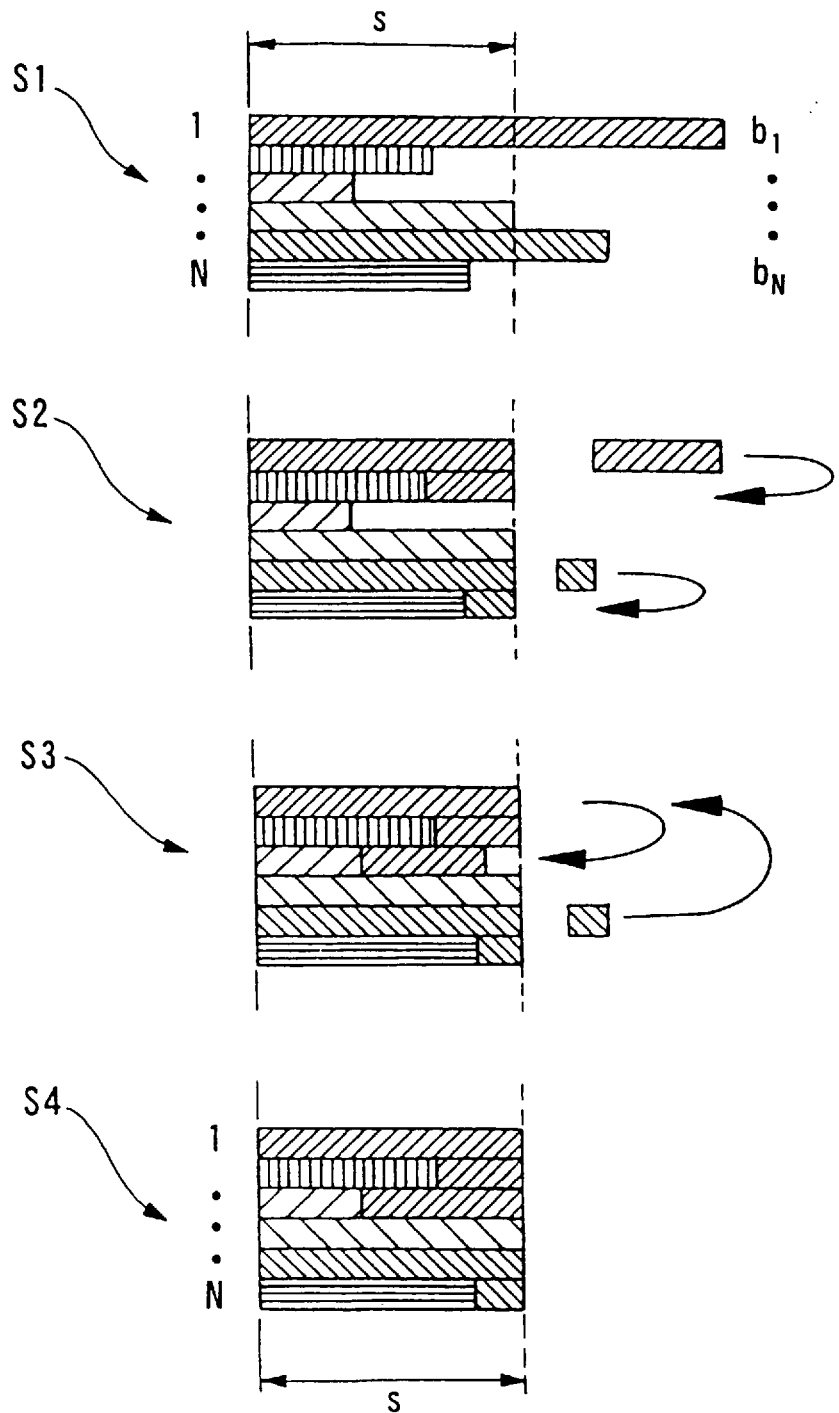
FIG. 9 is a view for explaining a method for pseudo-fixing the length of variable length codes.

FIG. 8 depicts the direction of data reading and the degree of error correction ability at that time. Usually, data are read in a direction as indicated by horizontal arrows of FIG. 8 first with the block 1. However, in the error correction coding processing, data are read in a direction as indicated by vertical arrows of FIG. 8. Density of phantom lines applied to FIG. 8 show how high the error correction ability is. That is, each bit of each block is subjected to error correction processing from the leading head and for each $C_1$ bit, $C_2$ bit, ... $C_M$ at different coding factors. At that time, since the bits are read in the direction as indicated by the vertical arrows of FIG. 8, the number of bits which are simultaneously subjecting to error correction coding processing at their own coding factors is $N*C_i$ bit.

Those data processed in the error correction coding circuit 27 shown in FIG. 7 are output in the form of final transmission data to an output terminal 29.

In the conventional method, when a certain error correction is performed, the blocks tend to be unduly redundant and effective error recovery is difficult to obtain. When B-FEC is applied, additional information such as a coding pattern is required to transmit. Moreover, error correction ability requires to be changed frequently for each block.

According to the present invention, data are arranged in such a manner as to be steppingly increased in sensibility for each block. Moreover, since the bit length is fixed by pseudo-fixing, it is clearly recognized. Taking advantage of this feature, all the blocks are read from the top bit and for each predetermined section, so that they are coded to have different correction abilities, respectively. Thus, according to the present invention, efficient error recovery can be realized without a need of additional information such as a coding pattern and frequent changing of error correction ability.

What is claimed is:

1. A pseudo-fixing length data transmission device comprising:

threshold arithmetic calculation means for calculating a threshold corresponding to a bit length of each variable length coded data block for each block group consisting of a plurality of variable length coded data blocks to be transmitted;

judgment means for judging whether or not each variable length coded data block has a bit length exceeding the threshold;

block division means for dividing, when the judgment result of said judgment means is affirmative, the variable length coded data block having a bit length exceeding the threshold into a plurality of data blocks and returning the data blocks to the original block group;

pseudo-fixing length means for reconstituting the data blocks obtained by said block division means and the rest of the variable length coded data blocks so that all of the data blocks have an averaged bit length for each block group; and transmitting means for transmitting the reconstituted data blocks.

2. A pseudo-fixing length data transmission device comprising:

threshold arithmetic calculation means for calculating a threshold corresponding to a bit length of each variable length coded data block for each block group consisting of a plurality of variable length coded data blocks to be transmitted;

judgment means for judging whether or not each variable length coded data block has a bit length exceeding the threshold;

group separation means for separating variable length coded data blocks having a bit length exceeding the threshold from the respective block groups to which said variable length coded data blocks belong, so that the separated data blocks constitute a new group of data blocks;

pseudo-fixing length means for reconstituting the variable length coded data blocks so that all of the data blocks have an averaged bit length for each block group; and transmitting means for transmitting the reconstituted data blocks.

3. A pseudo-fixing length data transmission device according to claim 1, in which said threshold arithmetic calculation means obtains a threshold based on an average value of the bit lengths of variable length coded data blocks belonging to each block group.

4. A pseudo-fixing length data transmission device according to claim 2, in which said threshold arithmetic calculation means obtains a threshold based on an average value of the bit lengths of variable length coded data blocks belonging to each block group.

5. A pseudo-fixing length data transmission device comprising:

first pseudo-fixing length means for reconstituting variable length coded data blocks so that all of the data blocks have an averaged bit length for each block group consisting of a plurality of variable length coded data blocks to be transmitted;

distribution number arithmetic calculation means for calculating a distribution number indicating how many numbers of fixed length data blocks to which each variable length coded data block is distributed by said fixing length means;

block division means for dividing a variable length coded data block, whose distribution number exceeds a predetermined threshold, into a plurality of data blocks and returning the data blocks to the original block group;

second pseudo-fixing length means for reconstituting the data blocks obtained by said block division means and the rest of the variable length coded data blocks again so that all of the data blocks have an averaged bit length for each block group processed by said block division means; and transmitting means for transmitting the reconstituted data blocks.

6. A pseudo-fixing length data transmission device comprising:

first pseudo-fixing length means for reconstituting variable length coded data blocks so that all of the data blocks have an averaged bit length for each block group consisting of a plurality of variable length coded data blocks to be transmitted;

distribution number arithmetic calculation means for calculating a distribution number indicating how many numbers of fixed length data blocks to which each variable length coded data block is distributed by said fixing length means;

group separation means for separating variable length coded data blocks having a distribution number exceeding the threshold from the respective block groups to which said variable length coded data blocks belong, so that the separated data blocks constitute a new group of data blocks;

second pseudo-fixing length means for reconstituting the variable length coded data blocks again so that all of the data blocks have an averaged bit length for each block group processed by said group separation means; and transmitting means for transmitting the reconstituted data blocks.

7. A pseudo-fixing length data transmission device comprising:

block grouping means for classifying a plurality of variable length coded data blocks to be transmitted into several groups of blocks based on bit lengths thereof;

pseudo-fixing length means for reconstituting the variable length coded data blocks so that all of the data blocks have an averaged bit length for each block group; and transmitting means for transmitting the reconstituted data blocks.

8. A pseudo-fixing length data transmission device according to one of claims 1 through 7, further comprising means for effecting an error recovery such that sensitivity for code errors of data is steppingly varied within each pseudo-fixed length data block and correction ability is steppingly varied within each block group consisting of a plurality of pseudo-fixed length data blocks, the error recovery being carried out from the top bit of each of the pseudo-fixed length data blocks constituting each block group.

9. A pseudo-fixing length data transmission method comprising:

calculating a threshold corresponding to a bit length of each variable length coded data block for each block group consisting of a plurality of variable length coded data blocks to be transmitted;

judging whether or not each variable length coded data block has a bit length exceeding the threshold;

dividing the variable length coded data block having a bit length exceeding the threshold into a plurality of data blocks and returning the plurality of data blocks to its original block group;

reconstituting the data blocks obtained by said block division means and the rest of the variable length coded data blocks so that all of the data blocks have an averaged bit length for each block group; and transmitting the reconstituted data blocks.

10. A pseudo-fixing length data transmission method according to claim 9, wherein said calculating step includes obtaining a threshold based on an average value of the bit lengths of the variable length coded data blocks belonging to each block group.

11. A pseudo-fixing length data transmission method according to claim 13, further comprising effecting an error recovery such that sensitivity for code errors of data is steppingly varied within each pseudo-fixed length data block and correction ability is steppingly varied within each block group consisting of a plurality of pseudo-fixed length data blocks, the error recovery being carried out from the top bit of each of the pseudo-fixed length data blocks constituting each block group.

12. A pseudo-fixing length data transmission method comprising:

calculating a threshold corresponding to a bit length of each variable length coded data block for each block group consisting of a plurality of variable length coded data blocks to be transmitted;

judging whether or not each variable length coded data block has a bit length exceeding the threshold;

separating variable length coded data blocks having a bit length exceeding the threshold from the respective block groups to which said variable length coded data blocks belong so that the separated data blocks constitute a new group of data blocks; and reconstituting the variable length coded data blocks so that all of the data blocks have an averaged bit length for each block group; and transmitting the reconstituted data blocks.

13. A pseudo-fixing length data transmission method according to claim 14, wherein said calculating step includes obtaining a threshold based on an average value of the bit lengths of the variable length coded data blocks belonging to each block group.

14. A pseudo-fixing length data transmission method according to claim 12, further comprising effecting an error recovery such that sensitivity for code errors of data is steppingly varied within each pseudo-fixed length data block and correction ability is steppingly varied within each block group consisting of a plurality of pseudo-fixed length data blocks, the error recovery being carried out from the top bit of each of the pseudo-fixed length data blocks constituting each block group.

15. A pseudo-fixing length data transmission method comprising:

reconstituting variable length coded data blocks so that all of the data blocks have an averaged bit length for each block group consisting of a plurality of variable length coded data blocks to be transmitted;

calculating a distribution number indicating how many numbers of fixed length data blocks to which each variable length coded data block is to be distributed; and dividing a variable length coded data block, whose distribution number exceeds a predetermined threshold, into a plurality of data blocks and returning the data blocks to the original block group;

reconstituting the data blocks obtained by said block division means and the rest of the variable length coded data blocks again so that all of the data blocks have an averaged bit length for each block group processed by said block division means; and transmitting the reconstituted data blocks.

16. A pseudo-fixing length data transmission method according to claim 15, further comprising effecting an error recovery such that sensitivity for code errors of data is steppingly varied within each pseudo-fixed length data block and correction ability is steppingly varied within each block group consisting of a plurality of pseudo-fixed length data blocks, the error recovery being carried out from the top bit of each of the pseudo-fixed length data blocks constituting each block group.

17. A pseudo-fixing length data transmission method comprising:

reconstituting variable length coded data blocks so that all of the data blocks have an averaged bit length for each block group consisting of a plurality of variable length coded data blocks to be transmitted;

calculating a distribution number indicating how many numbers of fixed length data blocks to which each variable length coded data block is to be distributed; and separating variable length coded data blocks having a distribution number exceeding the threshold from the respective block groups to which said variable length coded data blocks belong, so that the separated data blocks constitute a new group of data blocks:

reconstituting the variable length coded data blocks again so that all of the data blocks have an averaged bit length for each block group processed by said group separation means; and transmitting the reconstituted data blocks.

18. A pseudo-fixing length data transmission method according to claim 7, further comprising effecting an error recovery such that sensitivity for code errors of data is steppingly varied within each pseudo-fixed length data block and correction ability is steppingly varied within each block group consisting of a plurality of pseudo-fixed length data blocks, the error recovery being carried out from the top bit of each of the pseudo-fixed length data blocks constituting each block group.

19. A pseudo-fixing length data transmission method comprising:

classifying a plurality of variable length coded data blocks to be transmitted into several groups of blocks based on bit lengths thereof;

reconstituting the variable length coded data blocks so that all of the data blocks have an averaged bit length for each block group; and transmitting the reconstituted data blocks.

20. A pseudo-fixing length data transmission method according to claim 19, further comprising effecting an error recovery such that sensitivity for code errors of data is steppingly varied within each pseudo-fixed length data block and correction ability is steppingly varied within each block group consisting of a plurality of pseudo-fixed length data blocks, the error recovery being carried out from the top bit of each of the pseudo-fixed length data blocks constituting each block group.

* * * * *

UNITED STATES PATENT AND TRADEMARK OFFICE
CERTIFICATE OF CORRECTION

PATENT NO. : 5,886,652
DATED : March 23, 1999
INVENTOR(S) : Satoru Adachi et al.

It is certified that error appears in the above-identified patent and that said Letters Patent is hereby corrected as shown below:

<u>Title page,</u>
<u>Column 1,</u>
Item [21], please change "692,857" to -- 08/692,857 --.

<u>Column 2,</u>
Under "*Attorneys*", pleases change "Rogers & Wells LLP" to -- Brinks Hofer Gilson & Lione --.

<u>Claims,</u>
<u>Claim 11,</u>
Line 2, please change "13" to -- 9 --.

<u>Claim 13,</u>
Line 2, please change "14" to -- 12 --.

<u>Claim 15,</u>
Line 10, please delete "and".

<u>Claim 17,</u>
Line 10, please delete "and".
Line 15, please change ":" (colon) to -- ; -- (semicolon).

<u>Claim 18</u>
Line 2, please change "7" to -- 17 --.

Signed and Sealed this

Thirtieth Day of October, 2001

Attest:

NICHOLAS P. GODICI
*Attesting Officer*    *Acting Director of the United States Patent and Trademark Office*